(12) United States Patent
Talagala et al.

(10) Patent No.: US 6,880,060 B2
(45) Date of Patent: Apr. 12, 2005

(54) METHOD FOR STORING METADATA IN A PHYSICAL SECTOR

(75) Inventors: Nisha D. Talagala, Fremont, CA (US); Brian Wong, Gordonsville, VA (US)

(73) Assignee: Sun Microsystems, Inc., Palo Alto, CA (US)

( * ) Notice: Subject to any disclaimer, the term of this patent is extended or adjusted under 35 U.S.C. 154(b) by 345 days.

(21) Appl. No.: 10/131,912

(22) Filed: Apr. 24, 2002

(65) Prior Publication Data

US 2003/0204699 A1 Oct. 30, 2003

(51) Int. Cl.$^7$ .............................................. G06F 12/00
(52) U.S. Cl. ..................... 711/170; 711/171; 711/172; 711/173; 711/202; 711/206; 711/209; 714/8; 714/52
(58) Field of Search ............................. 711/2, 170, 173, 711/201, 202, 206, 209, 212, 171, 172; 714/6.7, 8, 52

(56) References Cited

U.S. PATENT DOCUMENTS

| | | | | |
|---|---|---|---|---|
| 5,995,308 | A  * | 11/1999 | Assouad et al. ............... | 360/53 |
| 6,343,343 | B1 * | 1/2002 | Menon et al. ............... | 711/114 |
| 6,553,511 | B1 * | 4/2003 | DeKoning et al. ............. | 714/6 |
| 6,584,544 | B1 * | 6/2003 | Morley et al. ............... | 711/114 |
| 6,606,629 | B1 * | 8/2003 | DeKoning et al. ........... | 707/100 |
| 6,684,289 | B1 * | 1/2004 | Gonzalez et al. ............ | 711/103 |
| 2003/0145270 | A1 * | 7/2003 | Holt ............................ | 714/766 |
| 2003/0163777 | A1 * | 8/2003 | Holt ............................ | 714/763 |

* cited by examiner

*Primary Examiner*—Mano Padmanabhan
*Assistant Examiner*—Jasmine Song
(74) *Attorney, Agent, or Firm*—Blakely, Sokoloff, Taylor & Zafman

(57) ABSTRACT

A method for embedding integrity metadata. In one exemplary embodiment, a plurality of integrity metadata segments is determined. Each integrity metadata segment is associated with a segment of user data. The user data is mapped to a plurality of physical sectors, each physical sector containing a segment of user data and the associated integrity metadata segment. For one exemplary embodiment, a common I/O data block size is determined, and its data is mapped into a number of 512-byte sectors. The number of 512-byte sectors corresponds to the number required for the common I/O data block size plus one or more additional 512-byte sectors. This creates additional space in each sector to accommodate the integrity metadata. Integrity metadata for each data segment of the common I/O size is determined. The integrity metadata for each sector is mapped to the additional space of each sector.

9 Claims, 4 Drawing Sheets

METHOD FOR STORING METADATA IN A PHYSICAL SECTOR

FIELD OF THE INVENTION

This invention relates generally to data storage systems and more particularly to the detection of corrupt data in such systems.

BACKGROUND OF THE INVENTION

Typical large-scale data storage systems today include one or more dedicated computers and software systems to manage data. A primary concern of such data storage systems is that of data corruption and recovery. Data corruption may occur in which the data storage system returns erroneous data and doesn't realize that the data is wrong. Silent data corruption may result from hardware failures such as a malfunctioning data bus or corruption of the magnetic storage media that may cause a data bit to be inverted or lost. Silent data corruption may also result from a variety of other causes; in general, the more complex the data storage system, the more possible causes of silent data corruption.

Silent data corruption is particularly problematic. For example, when an application requests data and gets the wrong data this may cause the application to crash. Additionally, the application may pass along the corrupted data to other applications. If left undetected, these errors may have disastrous consequences (e.g., irreparable undetected long-term data corruption).

The problem of detecting silent data corruption is addressed by creating integrity metadata (data pertaining to data) for each data block. Integrity metadata may include a block address to verify the location of the data block, or a checksum to verify the contents of a data block.

A checksum is a numerical value derived through a mathematical computation on the data in a data block. Basically when data is stored, a numerical value is computed and associated with the stored data. When the data is subsequently read, the same computation is applied to the data. If an identical checksum results then the data is assumed to be uncorrupted. Checksum algorithms are developed so as to minimize the probability that the checksum and its associated data will be corrupted in the same way. The strength of a checksum depends on how likely it is that a data block experiencing a typical type of error will not result in a data block with an identical checksum.

The issue of where to store the integrity metadata arises. For example, a typical checksum together with other integrity metadata may require 8–16 bytes. Typical data storage systems using block-based protocols (e.g., SCSI) store data in blocks of 512-bytes in length so that all input/output (I/O) operations take place in 512-byte blocks (sectors). One approach is simply to extend the block so that the checksum may be included. So, instead of data blocks of 512-bytes in length, the system will now use data blocks of 520 or 528 bytes in length depending on the size of the checksum. This approach has several drawbacks. The extended data block method requires that every component of the data storage system from the processing system, through a number of operating system software layers and hardware components, to the storage medium be able to accommodate the extended data block. Data storage systems are frequently comprised of components from a number of manufacturers. For example, while the processing system may be designed for an extended block size, it may be using software that is designed for a 512-byte block. Additionally, for large existing data stores that use a 512-byte data block, switching to an extended block size may require unacceptable transition costs and logistical difficulties.

SUMMARY OF THE INVENTION

A method for embedding integrity metadata in a data block. In one exemplary embodiment of a method, a plurality of integrity metadata segments is determined. Each integrity metadata segment is associated with a segment of a user data. The user data is then mapped to a plurality of physical sectors such that each physical sector contains a segment of user data and the associated integrity metadata segment. In a preferred, exemplary embodiment, a common input/output (I/O) data block size for a data storage system implementing a block-based protocol is determined. A data block of the common I/O data block size is mapped to a number of physical sectors, the number of physical sectors corresponding to the number of physical sectors required to store the data plus at least one additional physical sector. The mapping is accomplished such that each physical sector contains unused bytes and such that no physical sector contains data from more than one data block of the common I/O data block size. Integrity metadata, pertaining to the data that has been mapped to each physical sector, is determined. The integrity metadata for each physical sector is then mapped into the unused bytes of each physical sector. Each physical sector now contains some of the original user data and the integrity metadata associated with the data. Thus, an embodiment of the present invention employs a shrunken block method to store metadata in standard size blocks.

Other features and advantages of the present invention will be apparent from the accompanying drawings, and from the detailed description, that follows below.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

As will be discussed in more detail below, one embodiment of the present invention is a method for embedding integrity metadata within a data block. In accordance with one embodiment, the 512-byte block size retained. A portion of the data of a block, along with the associated integrity metadata, is mapped to a 512-byte sector. The remaining data from the block is mapped to the next 512-byte sector. That is, the user data part of each physical sector is shrunken to accommodate the integrity metadata and the user data is distributed over more physical sectors.

In a preferred embodiment, a common I/O data block size for the data storage system is determined. The data from a data block of the common I/O data block size is mapped into a number of 512-byte sectors. The number of 512-byte sectors corresponds to the number required for the common I/O data block size plus one or more additional 512-byte sectors. This creates additional space in each sector to accommodate the integrity metadata, that is, each physical sector contains unused bytes. Integrity metadata for each data segment of the common I/O size is determined. The integrity metadata for each sector is then mapped to the additional space of each sector. In one embodiment 8 kilobytes (K bytes) of data and its accompanying integrity metadata are mapped to seventeen 512-byte sectors.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
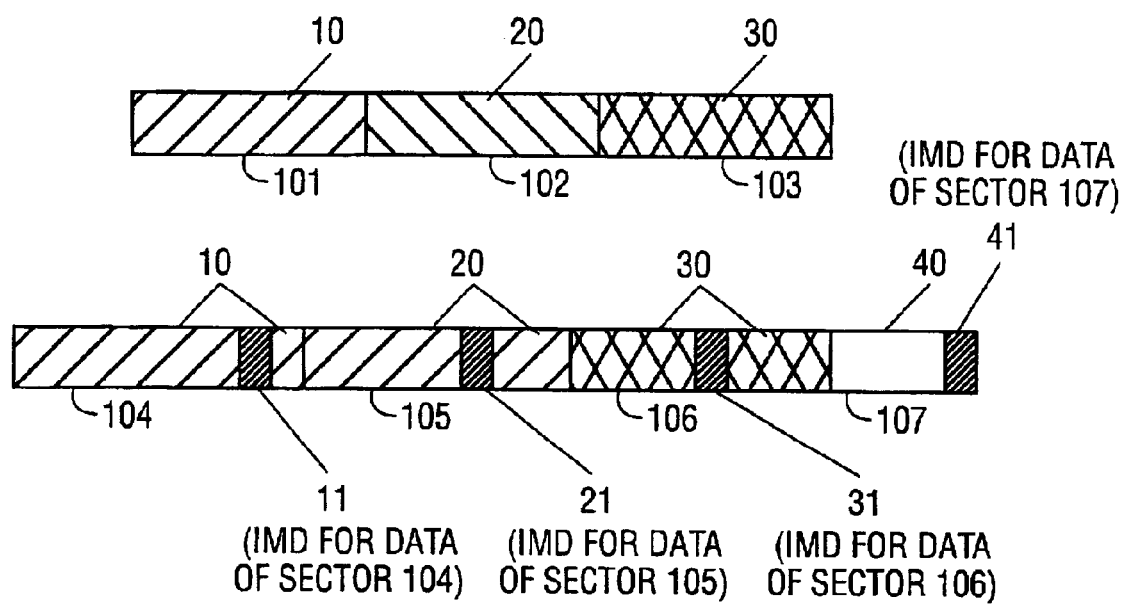
FIG. 1 illustrates "shrunken block" mapping in accordance with one embodiment of the present invention.

FIG. 1 illustrates "shrunken block" mapping in accordance with one embodiment of the present invention. As shown in FIG. 1, three 512-byte data blocks, namely 10, 20, and 30 are mapped into three 512-byte sectors, 101, 102, and 103 respectively. Data blocks 10, 20, and 30 do not include integrity metadata. In order to include the integrity metadata using the shrunken block method, the data is remapped to more sectors. Upon remapping, sector 104 includes a portion of the data from data block 10 as well as the integrity metadata 11. Integrity metadata 11 is the integrity metadata pertaining to the data mapped to sector 104. The remainder of data from data block 10 is included in a subsequent sector, e.g., sector 105. Sector 105 also includes a portion of the data from data block 20 as well as the integrity metadata 21. Integrity metadata 21 is the integrity metadata pertaining to the data mapped to sector 105. The remainder of data from data block 20 is included in sector 106. Sector 106 also includes a portion of the data from data block 30 as well as the integrity metadata 31. Integrity metadata 31 is the integrity metadata pertaining to the data mapped to sector 106. The remainder of data from data block 30 is included in sector 107. Sector 107 also includes a portion of the data from data block 40 as well as the integrity metadata 41. Integrity metadata 41 is the integrity metadata pertaining to the data mapped to sector 107.

The shrunken block method of embedding integrity metadata may require additional I/O operations. For example if the original data block is remapped over more than one physical sector, such that a single physical sector contains data from more than one original data block, write operations to the data block will now require a read/modify/write operation. This is because the storage system will effect I/O operations in the fixed block size (i.e., 512 bytes). In the current storage environment, it is not normal for systems to perform operations on data items whose size is not a multiple of the fixed sector size, although it is possible to create such a system.

Alternative embodiments of the method of the present invention may be implemented anywhere within the block-based portion of the I/O datapath. The datapath includes all software, hardware, or other entities that manipulate the data from the time that it enters block form on write operations to the point where it leaves block form on read operations. The datapath extends from the computer that reads or writes the data (converting it into block form) to the storage device where the data resides during storage. For example, the datapath includes software modules that stripe or replicate the data, the disk arrays that store or cache the data blocks, the portion of the file system that manages data in blocks, the network that transfers the blocks, etc.

Figure 2:
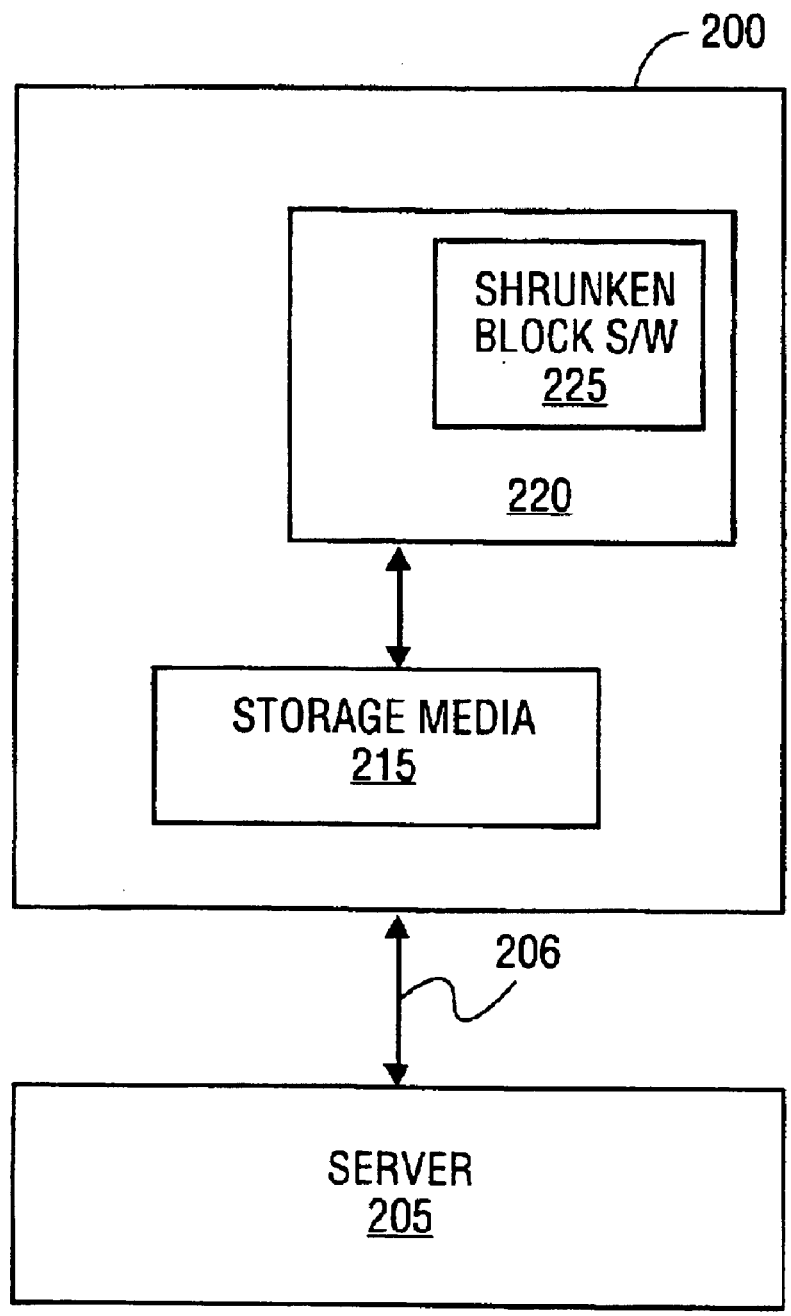
FIG. 2 illustrates an exemplary data storage system in accordance with alternative embodiments of the present invention

FIG. 2 illustrates an exemplary data storage system in accordance with an embodiment of the present invention. The method of the present invention may be implemented on the data storage system shown in FIG. 2. The data storage system 200, shown in FIG. 2 contains one or more mass storage devices 215 that may be magnetic or optical storage media. Data storage system 200 also contains one or more internal processors, shown collectively as the CPU 220. The CPU 220 may include a control unit, arithmetic unit and several registers with which to process information. CPU 220 provides the capability for data storage system 200 to perform tasks and execute software programs stored within the data storage system. The process of embedding integrity metadata within a data block in accordance with the present invention may be implemented by hardware and/or software contained within the data storage device 200. For example, the CPU 220 may contain a memory 225 that may be random access memory (RAM) or some other machine-readable medium, for storing program code (e.g., shrunken block software) that may be executed by CPU 220. The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals.

For one embodiment, the data storage system 200, shown in FIG. 2, may include a processing system 205 (such as a PC, workstation, server, mainframe or host system). Users of the data storage system may be connected to the server 205 via a local area network (not shown). The data storage system 200 communicates with the processing system 205 via a bus 206 that may be a standard bus for communicating information and signals and may implement a block-based protocol (e.g., SCSI or fibre channel). The CPU 220 is capable of responding to commands from processing system 205.

It is understood that many alternative configurations for a data storage system in accordance with alternative embodiments are possible. For example, the embodiment shown in FIG. 2 may, in the alternative, have the shrunken block software implemented in the processing system. The shrunken block software may, alternatively be implemented in the host system.

Figure 3:
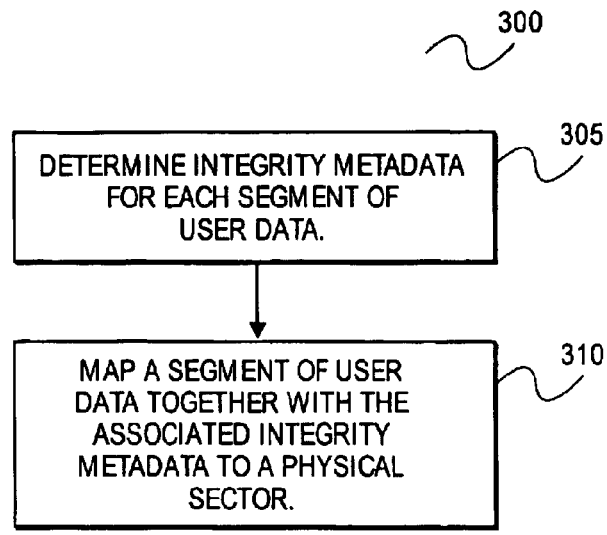
FIG. 3 is a process flow diagram in accordance with one embodiment of the present invention.

FIG. 3 is a process flow diagram in accordance with one embodiment of the present invention. Process 300, shown in FIG. 3, begins with operation 305 in which integrity metadata is determined for each segment of user data. Integrity metadata may typically be 2–3% of the size of the user data to which it pertains. At operation 310 a segment of user data and its associated integrity metadata are mapped to physical sector. That is a segment length for a segment of user data is selected such that the user data and the integrity metadata segment associated with it, together, fill a physical sector of a data storage system. For example, typical systems use a 512 byte physical sector. The integrity metadata segment may be 16 bytes in length. This yields a user data segment of 496 bytes in length. That is, 496 bytes of user data, together with the 16 bytes of integrity metadata pertaining to it, are mapped to a 512 byte physical sector. In an alternative embodiment the length of the metadata segment and/or the size of the physical sector may be different thus resulting in a different segment length of the user data.

For one embodiment, the user data may have been originally mapped such that each segment of user data filled a physical sector. For such an embodiment, a portion of the original data segment together with the integrity metadata pertaining to the portion are mapped to a physical sector. The remainder of the original segment is mapped to a subsequent physical sector as described above in reference to FIG. 1.

Figure 4:
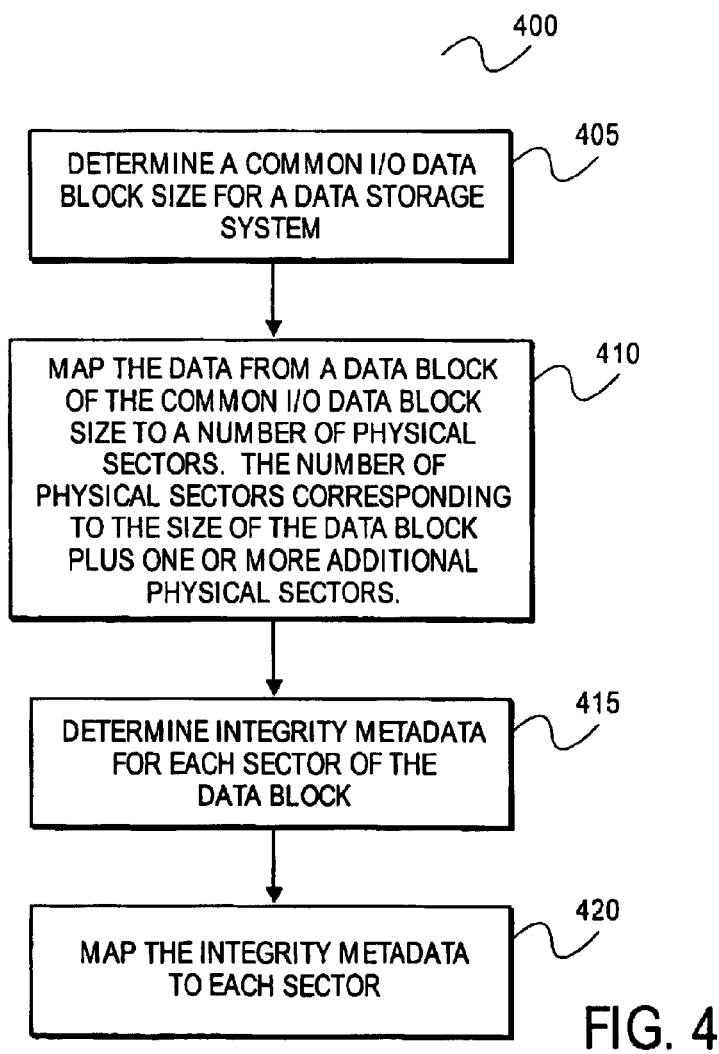
FIG. 4 is a process flow diagram in accordance with an alternative embodiment of the present invention and FIG. 5 illustrates the data mapping in accordance with one embodiment of the present invention.

FIG. 4 is a process flow diagram in accordance with one such embodiment of the present invention. Process 400, shown in FIG. 4, begins with operation 405 in which a common I/O data block size is determined for a data storage system. Typically, data storage systems have a common I/O data block size in which many of their I/O operations take place. So even though storage systems effect I/O operations in 512-byte sectors, many systems have a common I/O data block size that is some multiple of 512-bytes. In a typical system, a majority of I/O operations may take place using the common I/O data block size. For example, the Solaris data storage system manufactured by Sun Microsystems Inc. of Santa Clara, Calif. has a common I/O data block size of 8K bytes that may account for up to 80% of I/O operations.

At operation 410 the data from the common I/O size data block is mapped to a number of physical sectors. These physical sectors could be 512 bytes in length. The number of 512-byte sectors corresponds to the number required for the common I/O data block size plus one or more additional 512-byte sectors. This creates additional space in each sector to accommodate the integrity metadata. That is, each physical sector will have unused bytes due to mapping the data block into more physical sectors than required to store the data. For example, for a common I/O size data block of 8K bytes, the 8K bytes of data may be mapped into 17 512-byte sectors thus leaving 30 unused bytes for each sector. The amount of space allocated for integrity metadata in each physical sector is determined by the mapping and may result in more space than required for the actual integrity metadata. If the space allocated for integrity metadata cannot be divided evenly between all physical sectors there will be some available space at the end of the last sector.

In an alternative embodiment, more than one additional 512-byte sector is added to the data block of the common I/O data block size. This may be done to accommodate a greater amount of integrity metadata. For example, for a common I/O data block size of 8K if the integrity metadata for each sector is more than 30 bytes in length then an additional sector or sectors would be added to the data block. Also, if the common I/O data block size is larger, an additional sector or sectors may be required. For example, if the common I/O data block size is 32K bytes then integrity metadata of only 8 bytes for each 512-byte sector would require the addition of two sectors.

At operation 415 integrity metadata is determined for each 512-byte sector of the data block. The integrity metadata may be a checksum, a block address, or other integrity metadata as known in the art, or any combination thereof. In accordance with an embodiment of the present invention, each data block of the common I/O data block size will require at least one 512-byte sector allocated for metadata. The metadata space allocated to each physical sector can be used in several different ways. For example, the space may contain a checksum, which can then be verified by several layers of software in the storage system or I/O stack. Since the checksum is now embedded in the data block, each replicated data copy will have its own checksum. Because a checksum may typically be 8 bytes in length, there may be more space than required for a checksum.

At operation 420 the integrity metadata is mapped to the additional space in each sector allocated for integrity metadata. The entire data block together with its associated integrity metadata is now mapped into 512-byte physical sectors. Each I/O data block starts at a physical sector boundary, and two data blocks never share a physical sector. The use of 512 byte physical sectors in the preceding description of an embodiment is exemplary. The method of FIG. 4 can also be performed for sector sizes other than 512 bytes. For example, sector sizes of 4096 could be used.

The embedded integrity metadata is now available to any software layer or hardware component that wishes to verify the data-metadata relationship. In contrast to the prior art, the block size has not been changed and therefore any software layer or hardware component that is unaware of the presence of the integrity metadata may simply treat the block as if it were all data. No changes to existing APIs or underlying storage devices are required.

Additionally, for the common I/O data block, a data storage system may now avoid the additional I/O operations incumbent when a data block is distributed over multiple physical sectors. That is, a write to the data block is affected by a single write operation and does not include the additional I/O operations (i.e., read/modify/write) of the shrunken block method. Of course this only applies to I/O operations of the common size. However, the common I/O data block size may account for a vast majority of I/O operations.

Figure 5:
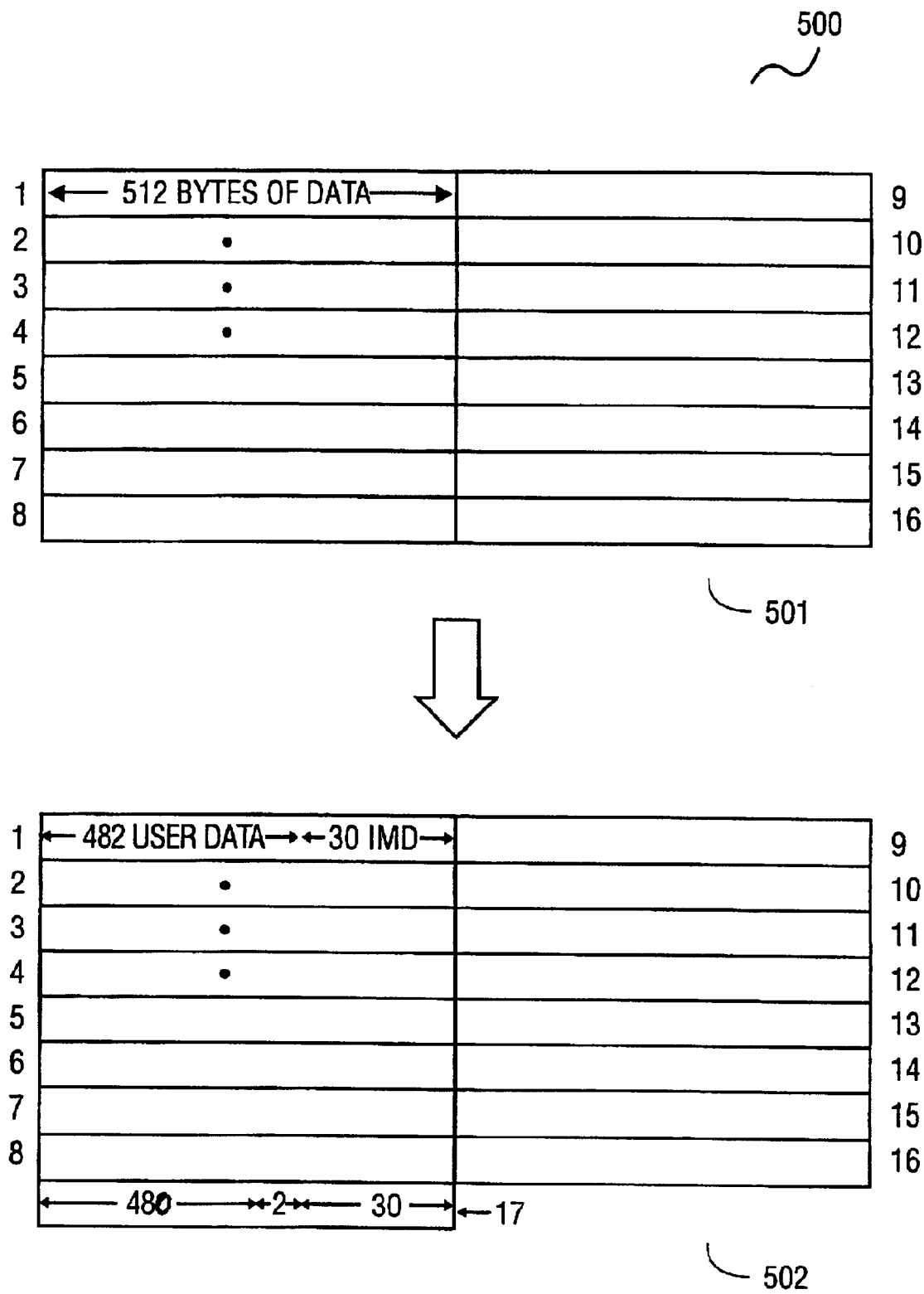

FIG. 5 illustrates the data mapping in accordance with one embodiment of the present invention. The data mapping begins with a common I/O size data block mapped into a number of physical sectors. Data block 501, shown in FIG. 5, illustrates a common I/O data block size of 8K bytes mapped into 16 512-byte physical sectors, sectors 1–16. Each of the 16 physical sectors contains 512 bytes of user data.

As discussed above in reference to operation 410 of FIG. 4, the user data is remapped to a number of physical sectors. Data block 502 illustrates the data from data block 501 remapped into 17 512-byte sectors in accordance with one embodiment of the present invention. As shown in data block 502, 16 of the sectors now contain 482 bytes of user data, with the last sector (sector 17) containing the remaining 480 bytes of user data and 2 unused bytes. As discussed above in reference to operations 415 and 420 of FIG. 4, integrity metadata is determined for each of the 17 482-byte sectors of data block 502 and the integrity metadata for each sector is mapped into the 30 byte segment of unused space within the physical sector. Thus, each physical sector now contains user data and its associated integrity metadata and data blocks of a common I/O size are mapped to an integral number of physical sectors.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
    determining a common input/output (I/O) data block size for a data storage system, the data storage system implementing a block-based protocol;
    mapping data of a data block of the common I/O data block size to a number of physical sectors, the number of physical sectors corresponding to the number of physical sectors required to store the data plus at least one additional physical sector, such that each physical sector contains unused bytes;

determining integrity metadata for each physical sector; and mapping the integrity metadata for each physical sector into the unused bytes of each physical sector such that each physical sector contains an equal number of unused bytes with any remaining unused bytes allocated to a last physical sector.

2. The method of claim 1, wherein the block-based protocol is a protocol selected from the group consisting of small computer systems interface (SCSI), serial storage architecture (SSA), fiber channel, or ATA.

3. The method of claim 1, wherein the integrity metadata is data selected from the group consisting of checksum data, block address data, or a combination thereof.

4. A machine-readable medium containing instructions which, when executed by a processing system, cause the processing system to perform a method, the method comprising:

determining a common input/output (I/O) data block size for a data storage system, the data storage system implementing a block-based protocol;

mapping data of a data block of the common I/O data block size to a number of physical sectors, the number of physical sectors corresponding to the number of physical sectors required to store the data plus at least one additional physical sector, such that each physical sector contains unused bytes and such that no physical sector contains data from more than one data block of the common I/O data block size;

determining integrity metadata for each physical sector; and mapping the integrity metadata for each physical sector into the unused bytes of each physical sector such that each physical sector contains an equal number of unused bytes with any remaining unused bytes allocated to a last physical sector.

5. The machine-readable medium of claim 4, wherein the block-based protocol is a protocol selected from the group consisting of small computer systems interface (SCSI), serial storage architecture (SSA), fiber channel, or ATA.

6. The machine-readable medium of claim 4, wherein the integrity metadata is data selected from the group consisting of checksum data, block address data, or a combination thereof.

7. A data storage system comprising:

a storage media;

a processing system; and a memory, coupled to the processing system, characterized in that the memory has stored therein instructions which, when executed by the processing system, cause the processing system to a) determine a common input/output (I/O) data block size for the data storage system, the data storage system implementing a block-based protocol, b) map data of a data block of the common I/O data block size to a number of physical sectors, the number of physical sectors corresponding to the number of physical sectors required to store the data plus at least one additional physical sector, such that each physical sector contains unused bytes and such that no physical sector contains data from more than one data block of the common I/O data block size, c) determine integrity metadata for each physical sector, and d) map the integrity metadata for each physical sector into the unused bytes of each physical sector such that each physical sector contains an equal number of unused bytes with any remaining unused bytes allocated to a last physical sector.

8. The data storage system of claim 7, wherein the block-based protocol is a protocol selected from the group consisting of small computer systems interface (SCSI), serial storage architecture (SSA), fiber channel, or ATA.

9. The data storage system of claim 8, wherein the integrity metadata is data selected from the group consisting of checksum data, block address data, or a combination thereof.

* * * * *